United States Patent [19]

Schlaudroff et al.

[11] 3,831,641

[45] Aug. 27, 1974

[54] WINDING INSERTING APPARATUS

[75] Inventors: Leo M. Schlaudroff; Hollace R. McKinley, both of Fort Wayne, Ind.

[73] Assignee: General Electric Company, Fort Wayne, Ind.

[22] Filed: Dec. 4, 1972

[21] Appl. No.: 311,815

[52] U.S. Cl............ 140/92.1, 29/205 D, 29/205 R, 29/596, 29/606
[51] Int. Cl..................... B21f 3/00, H02k 15/06
[58] Field of Search...... 140/92.1; 29/205 E, 205 D, 29/205 R, 596, 606

[56] References Cited
UNITED STATES PATENTS

| | | | |
|---|---|---|---|
| 3,324,536 | 6/1967 | Hill | 29/205 D |
| 3,377,690 | 4/1968 | Eminger | 29/205 R |
| 3,389,865 | 6/1968 | Stuckey | 29/20 R X |
| 3,507,029 | 4/1970 | Stuckey | 29/205 D |
| 3,608,176 | 9/1971 | Wieckhorst | 29/205 R |
| 3,672,039 | 6/1972 | Arnold | 29/596 |
| 3,685,118 | 8/1972 | Payne et al. | 29/205 D |
| 3,689,976 | 9/1972 | Donovan | 29/205 D |
| 3,717,918 | 2/1973 | Droll | 29/205 R |

FOREIGN PATENTS OR APPLICATIONS 730,684  12/1942  Germany

*Primary Examiner*—Charles W. Lanham
*Assistant Examiner*—D. C. Reiley, III

[57] ABSTRACT

A coil winding and inserting machine having coil forming means for forming a plurality of turns of wire into coils wherein at least a part of the coil forming means may be passed through a stator bore in the direction of the axis thereof to aid in inserting the coils into slots between adjacent teeth of the stator. The inserting part of the coil forming means includes spring means disposed on and moveable with such part. The spring means prevent direct contact between wire and stator tooth sides during the coil insertion process to thereby minimize wire damage.

9 Claims, 6 Drawing Figures

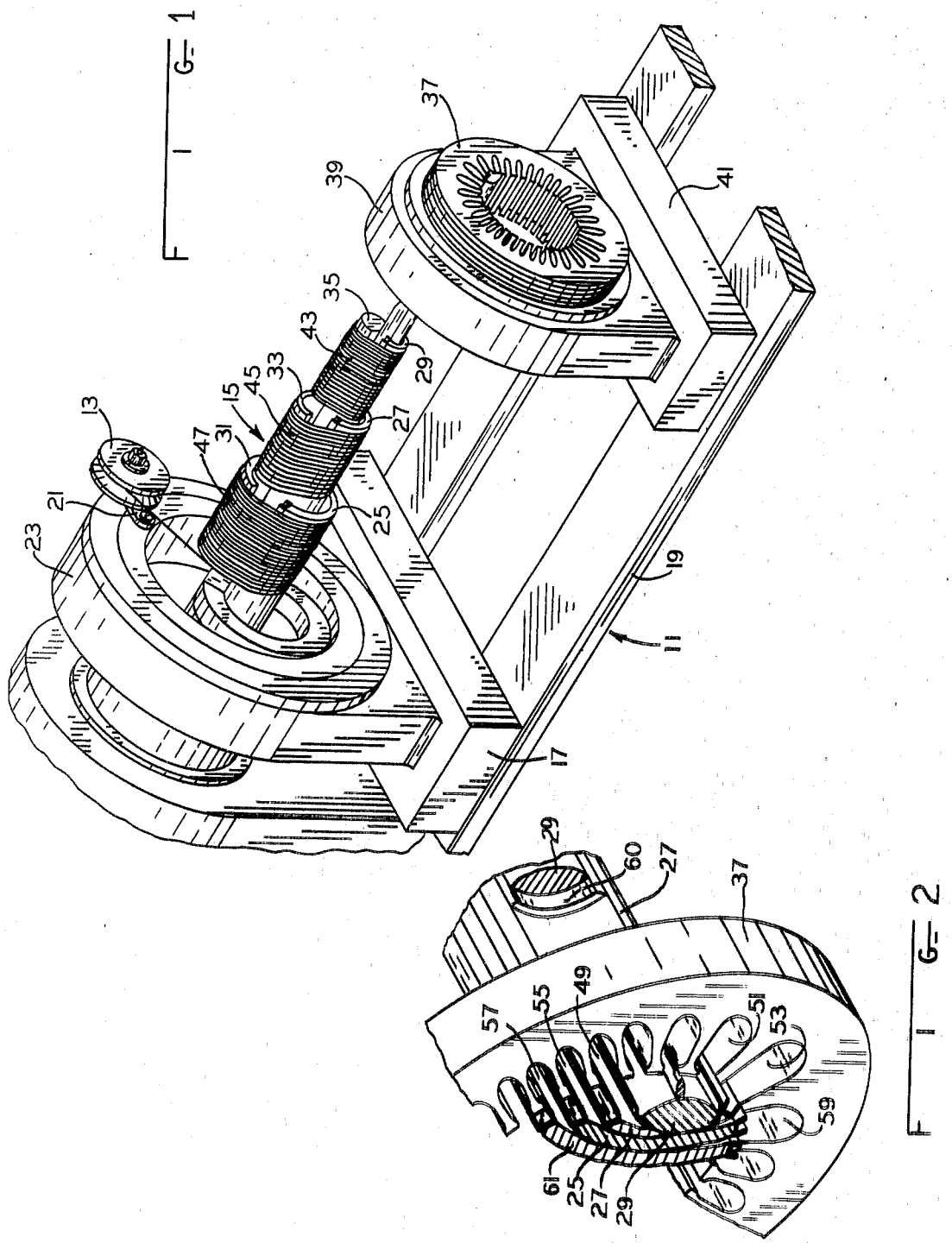

WINDING INSERTING APPARATUS

CROSS REFERENCE TO RELATED APPLICATIONS

Our application Ser. No. 306,527, filed Nov. 15, 1972, and titled "Winding And Inserting Apparatus And Method," is a related application. Other related applications are Smith application Ser. No. 311,769, filed on the same day as this application and titled "Wire Protecting Coil Placing Method And Apparatus;" and Habegger application Ser. No. 311,770, filed on the same day as this application and titled "Means And Method of Aligning Coil Injection Tooling With A Stator Core." All of these applications are assigned to the same assignee as the present application.

BACKGROUND OF THE INVENTION

The present invention relates generally to an improved apparatus for inserting side turn portions of wound coils into axially extending stator core slots. More specifically, it relates to apparatus having means for protecting wire from damage by the core teeth during coil insertion.

Equipment for placing windings in stator slots is known; and includes machines for winding coils directly in stator slots and machines for winding and then inserting coils into stator slots. One type of machine in the latter category is shown for example, by Mason U.S. Pat. No. 2,934,099; and Duff and Mason U.S. Pat. No. 3,528,170; the entire disclosures of each of which as well as the above "related applications" are specifically incorporated herein by reference. These Patents disclose, among other things, machines that include a coil form and a rotatable flyer. The coil form includes spaced apart members, selected ones of which are movable axially relative to a stator during insertion of coils into that stator.

However, during axial inserting of winding turns with this type of machine, individual wire segments are sometimes scratched because they rub against the sides of stator teeth when such segments are inserted into stator slots. As will be understood, this type of damage may also result when using coil insertion tooling of the type described in Arnold U.S. Pat. No. 3,672,039; the disclosure of which patent is also incorporated herein by reference. The insertion tooling of Arnold (like the tooling of the apparatus exemplified herein) includes arcuate divider blades, the ends of which are positionable adjacent to bore defining core tooth surfaces. Between adjacent ones of the divider blades are disposed pusher blades which push winding turn segments into core slots.

One object of the present invention to provide means for protecting wire from damage during the insertion of prewound coils from gaps defined by spaced apart divider blades into axially extending slots of a dynamoelectric machine stator core.

Even when spaced apart divider members are in proper alignment with corresponding stator teeth, the wire of coils being inserted may still be damaged as it is moved along a stator slot between closely adjacent, slot defining sides of stator teeth.

Accordingly, it is a more specific object of the present invention to provide shield members that establish divider blade extensions and that cover the sides of stator teeth while wire is being moved along such tooth sides so as to prevent wire damage.

Even when spaced apart divider blade members are properly aligned with corresponding stator teeth, such members may deflect slightly during the coil insertion process and this also could cause misalignment and resulting wire damage during the coil insertion process.

It is accordingly a further object of the present invention to maintain a desired predetermined alignment of coil inserting tooling and stator core teeth during a coil insertion process even when divider blades having tooth shielding extensions are used.

SUMMARY OF THE INVENTION

In carrying out the foregoing and other objects of the invention, in one preferred form, we provide a coil winding and inserting machine having a plurality of telescoping elongated divider blades or divider plates which, in a first position, participate in the coil winding process. These blades are movable toward a second position for participation in the process of inserting the wound coils into selected slots of a slotted magnetic stator core. Each blade has a coil forming portion which in the second position has at least one surface thereof extending between two selected core slots and which has protective lip portions extending from that surface into each of the two selected core slots in close proximity to one side thereof. The opposite surface of the blade, when in this second position, may extend between two additional selected stator slots; and have additional protective lip portions extending into each of the two additional selected slots so that wire may slide along or across the lip portions into the selected slots without being damaged by the stator teeth. The subject matter which we regard as our invention is particularly pointed out and distinctly claimed in the concluding portion of the specification. The invention itself, however, together with other objects, features, and advantages of the present invention will become more apparent by reference to the following detailed discription of a preferred embodiment when considered in conjunction with the drawing wherein:

BRIEF DISCRIPTION OF THE DRAWINGS

FIG. 1 is a perspective view of a portion of a coil winding and inserting machine embodying the present invention;

FIG. 2 is a perspective view, with parts removed and parts broken away, of a stator with tooling in the coil inserting position;

DISCRIPTION OF THE PREFERRED EMBODIMENTS

Figure 3:
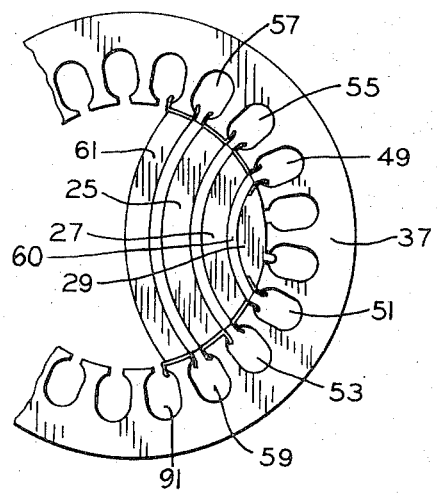
FIG. 3 is an end view of the stator and tooling of FIG. 2.

FIG. 1 illustrates a coil winding and inserting machine 11 embodying the invention in one form. The winding generating structure includes a wire dispensing pully 13 which rotates, as a part of a flier structure, about a coil form 15 laying wire thereon. Wire may be fed to pulley 13 in any suitable manner, e.g., as taught by Duff et al in U.S. Pat. No. 3,528,170; by Mason in U.S. Pat. No. 2,934,099; or by us in our above referenced co-pending application. At the same time that wire is layed on form 15, the carriage 17 moves along ways 19 so that the wire is wound about and uniformly distributed on the coil form 15. The wire dispensing pulley 13 is supported on a flier 21 which rotates within a housing 23 driven by a ring gear which is ultimately connected to a primary energy source for example, in the manner disclosed in the aforementioned Mason patent.

The coil form 15 is illustrated as being adapted to form three different size coils that collectively establish one coil group of winding turns for one pole of a dynamoelectric machine. The coil form 15 comprises telescoping elongated divider blades 25, 27 and 29, along with collapsible coil forming portions 31, 33 and 35. When the windings for one pole of the machine are completed, the wire is severed as taught in the aforementioned Mason patent and the collapsible portions 31, 33 and 35 of the coil form are caused to move toward the blades 25, 27 and 29 so as to relieve the tension on individual winding turns and thereby allow movement of the coils into a stator core 37 during the insertion process. As taught in the aforementioned patents and co-pending application, the stator 37 is held in a stator holder 39, which in turn is supported on another carriage 41 which may be moved along the ways 19.

An understanding of the insertion process may be aided by brief reference to FIGS. 3 and 2. FIG. 3 shows an end view of the stator 37 with the blades 25, 27, 29 and blade 61 passing therethrough; along with a pusher plate or blade 60. Comparing FIGS. 1 and 3, it will be understood that the winding turns of coil 43 lie between the blades 27 and 29 in such a position as to be inserted in the selected stator slots 49 and 51. The winding coil 45 lies between the blades 25 and 27 in such a position as to be inserted in the selected stator slots 53 and 55. Similarly winding coil 47 will be associated with the slots 57 and 59. An additional blade 61 (not readily visable in FIG. 1 because it is withdrawn to the left as viewed in FIG. 1 so as to not interfere with the winding process) functions to hold the winding coil 47 against the next adjacent blade 25 at the end of the winding cycle. As the blade 61 is moved toward the right as viewed in FIG. 1 so as to cover the winding coil 47, blades 25, 27 and 29 similarly move toward the stator so as to hold each winding coil between the predetermined pairs of blades. Also withdrawn to the left (and not visible in FIG. 1) are a plurality of pusher plates which lie between adjacent divider blades. The pusher plates are disposed behind the respective windings and are actuable to force the winding turns out from the gaps between pairs of divider blades and into slots in the stator all in accordance with the teachings in the aforementioned Mason Patent.

As most easily seen in FIG. 3, a given winding must at some time during the insertion process pass between two adjacent stator teeth in order to enter a given stator core slot. If the two blades that entrap any given winding coil are accurately aligned with the corresponding stator core teeth, the given winding coil should in theory at least slip from between the blades and into the stator slot with little or no damage; however, if one of the blades should be slightly misaligned, the sharp forward portion of the stator tooth may scratch or otherwise damage the wire or insulation thereon and this can result in a rejected stator. To prevent this and further to prevent the wire from scraping against the side of a stator tooth along the restricted slot entrances, we provide a series of protective lip members. The structure of preferred forms of these protective portions or lips is most easily understood from a review of FIGS. 4, 5, and 6.

Figure 4:
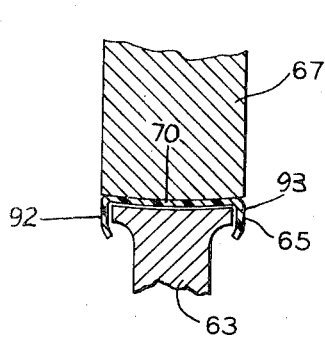
FIG. 4 is an enlarged fragmentary end view showing one stator tooth and a first form of tooling.
Figure 5:
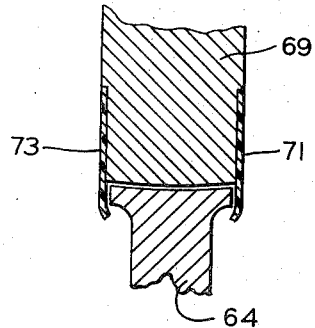
FIG. 5 is an enlarged fragmentary end view showing one stator tooth and a second form of tooling.

FIG. 4 illustrates one form of spring steel clip which may be employed, it being remembered that FIG. 4 (like FIGS. 5 and 6) shows an end view of a portion of a single stator tooth. The tooth 63 and the spring steel member 65 and blade 67 extend axially along the stator core a length or distance at least equal to the stack height of the stator core in which windings are to be placed. In FIG. 4, the protective lip portion comprises a single C-shaped spring steel member attached to the surface 70 of the blade 67 for example, by brazing, riveting, etc. The same result may be achieved as illustrated in FIG. 5 by undercutting slightly the surfaces of a blade 69 and providing a pair of leaves 71 and 73 which may be attached to the blade 69 by brazing or any other suitable fastening means. It might be desirable in some situations to only employ one such leaf for example, when only one of the two adjacent slots is to receive wire. This would be the case, for example with blade 29, since protection would be provided by blade 29 (see FIG. 3) only for wire being placed in slots 49 and 51. The approach taught by FIG. 5 would also be well suited for blade 61, since protection need be provided only for wires entering slots 57, 59; it being noted that lips or members on blade 61 that extend into slots 90, 91 are superfluous.

Rather than constructing a single flexible blade extension such as extension 71 or 73 in FIG. 5, the member 65 of FIG. 4 may be formed without lip 92 or without lip 93 when only one lip or extension is desired. In any case, it is preferred that extensions 92 and/or 93 closely fit against the edges on sides of tooth 63 as shown in FIG. 4. Of course a similar close fitting relationship of extensions with the sides of teeth 64 and 79 (see FIGS. 5 and 6) is preferred.

Figure 6:
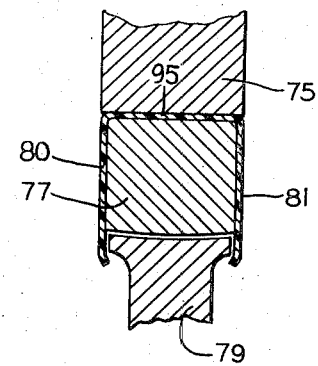
FIG. 6 is an enlarged fragmentary end view showing one stator tooth and a third form of tooling.

For each of the constructions shown in FIGS. 4–6, it is desirable for the gap facing surfaces of the flexible lips or extensions to provide a smooth transition region from the gap defining surfaces of the divider blades into the axially extending stator core slots.

In FIG. 6, the protective member 95 comprises a "C" shaped piece of, preferably, flexible material such as spring steel. This member is of the same general configuration as the member 65 of FIG. 4; although member 95 is somewhat deeper to allow a block 77 to lie between the stator tooth 79 and the region of attachment of the member 95 to the blade 75. In FIG. 6, protective member 95 includes lips 80 and 81 and may be attached to blade 75 by providing counter sunk holes in the block 77 and then using screws (with the screw heads in the counter sunk portion of the holes) to hold the block 77, member 95, and blade 75 in assembled relation. The lips will be thin, e.g., about 0.010 of an inch.

In FIGS. 4, 5, and 6 the protective lip portions 92, 65; 71, 73; and 81; are all seen to extend from the corresponding blade into slots on either side of and closely adjacent to the illustrated stator tooth. This arrangement protects the wire from the associated stator tooth and also assists in maintaining the desired predetermined relative positioning of the divider blades relative to that stator tooth. It should be noted that a slight clearance exists between the extensions shown in each of FIGS. 4–5 and the sides of core teeth 63, 64, 79 respectively. This clearance assures that interference will not occur between the protective lips and stator core while moving the divider blades axially into the bore of the stator core.

From the foregoing discussion it will be apparent that the illustrated apparatus may be used to wind a plurality of turns of wire about a form and then insert the formed wire into slots between adjacent teeth of a stator. This apparatus includes divider blades or plates that in a first position form a part of the coil form and in a second position extend in the stator bore from one stator tooth to a non-adjacent stator tooth for inserting the formed wire into the slots. The blades are telescopically movable relative to one another and at least those blades which have another blade on each side thereof are provided with means fixed to the blades and extending adjacent to the side or sides of corresponding stator teeth to provide extended surfaces. A plurality of pusher plates are interleaved with and movable relative to the blades so that a pusher plate lies between pairs of blades for forcing wire from between the blades into the stator slots. The protective extensions or lip portions which are fixed to the blades are moveable therewith along stator teeth to thereby minimize damage to the wire while it is being inserted into the stator slots.

Thus, while the present invention has been described in detail and summarized with respect to a specific embodiments, obvious variations may be made by those of ordinary skill in the art and such changes and modifications may be made without departing from the invention. It is therefore intended in the appended claims to cover all such changes and modifications that fall within the true spirit and scope of the invention.

What we claim is new and desire to secure by Letters Patents of the United States is:

1. A machine for winding coils and inserting the coils into selected slots extending axially between and defined by axially extending spaced apart teeth of a magnetic core, having a bore defined by the spaced apart teeth, said machine having a plurality of relatively telescoping elongated coil forming blade devices adapted to participate in a coil winding process in a first position relative to one another, and relatively movable toward a second relative position to participate in a process of inserting wound coils into selected ones of the slots of the magnetic core; each coil forming blade device comprising a coil forming portion which in the second relative position has at least one surface thereof extending axially along a core tooth between two selected core slots and at least one axially extending protective lip portion extending outwardly from the at least one surface along the side of a core tooth into a core slot.

2. The coil winding and inserting machine of claim 1 wherein at least two blade devices each have a second surface spaced from the at least one surface; the second surfaces respectively extending axially in the second relative position between two other selected stator core slots; each blade device further comprising at least one additional axially extending protective lip portion extending outwardly from the second surface thereof along the side of a core tooth and into a respective one of the two other selected stator core slots.

3. In a coil winding and inserting machine for winding a plurality of turns of wire about a form and for inserting the formed wire into slots between adjacent teeth of a stator, at least one movable blade which in a first position forms a part of the form and in a second position extends axially along the bore of a stator core from a first axially extending stator tooth to a second axially extending stator tooth, and first means for protecting wire from damage during a wire insertion process, said first means comprising an axially extending shield fixed to said at least one movable blade and having two spaced apart portions extending outwardly therefrom into a slot on either side of and defined by the first stator tooth.

4. The machine of claim 3 further comprising second means for protecting wire from damage during a wire inserting process, said second means comprising an axially extending shield fixed to said at least one movable blade and having two spaced apart portions extending outwardly therefrom into a slot on either side of and defined by the second stator tooth.

5. The machine of claim 4 wherein there are a plurality of movable blades telescopically movable relative to one another, at least those movable blades positioned between two other movable blades being provided with both said first means and said second means.

6. The machine of claim 5 further comprising a plurality of pusher blades interleaved with and movable relative to the movable blades for forcing wire from between the movable blades into stator slots.

7. The machine of claim 6 wherein each first means and each second means comprises a spring steel lip movable into covering relationship to the sides of a core tooth to thereby minimize damage to wire being inserted into stator slots established by the sides of the core tooth.

8. The machine of claim 7 wherein the free end of each spring steel lip fixed to one end of a movable blade converge toward one another to thereby closely embrace the sides of a stator tooth spanned by the corresponding movable blade.

9. The machine of claim 6 wherein each said first means and each said second means comprises a spring steel leaf attached to a surface of a movable blade, and slideable along the sides of a stator tooth to thereby provide protection for the wire while that wire is being inserted into the stator slots.

* * * * *